United States Patent
Bi et al.

(10) Patent No.: US 12,508,314 B2
(45) Date of Patent: Dec. 30, 2025

(54) HOMOGENEOUS PHARMACEUTICAL EXCIPIENT SODIUM STEARYL FUMARATE WITH FLAKY STRUCTURE AND PREPARATION METHOD THEREOF

(71) Applicant: ANHUI SUNHERE PHARMACEUTICAL EXCIPIENTS CO., LTD., Anhui (CN)

(72) Inventors: Yong Bi, Huainan (CN); Jiao Wu, Huainan (CN); Liting Ren, Huainan (CN); Huijuan Bao, Huainan (CN); Yunhe Shao, Huainan (CN)

(73) Assignee: ANHUI SUNHERE PHARMACEUTICAL EXCIPIENTS CO., LTD., Huainan (CN)

( * ) Notice: Subject to any disclaimer, the term of this patent is extended or adjusted under 35 U.S.C. 154(b) by 350 days.

(21) Appl. No.: 18/265,066

(22) PCT Filed: Sep. 9, 2022

(86) PCT No.: PCT/CN2022/117965
§ 371 (c)(1),
(2) Date: Jun. 2, 2023

(87) PCT Pub. No.: WO2023/036273
PCT Pub. Date: Mar. 16, 2023

(65) Prior Publication Data
US 2024/0024483 A1    Jan. 25, 2024

(30) Foreign Application Priority Data
Sep. 10, 2021 (CN) .......................... 202111061255.5

(51) Int. Cl.
*A61K 47/12* (2006.01)
*A61K 9/16* (2006.01)
(Continued)

(52) U.S. Cl.
CPC ............ *A61K 47/12* (2013.01); *A61K 9/1694* (2013.01)

(58) Field of Classification Search
CPC .... A61K 47/12; A61K 9/1694; A61K 9/1688; A61K 47/14; C07C 67/52; C07C 69/60; C07B 2200/13
See application file for complete search history.

(56) References Cited

U.S. PATENT DOCUMENTS 3,552,977 A * 1/1971 Bouchard et al. ..... A21D 2/145
426/321

FOREIGN PATENT DOCUMENTS

| CA | 3094115 A1 * | 9/2019 | ............... A61P 35/02 |
| CN | 104177260 A | 12/2014 | |

(Continued)

OTHER PUBLICATIONS

Pharm Excipients Sodium Stearyl Fumarate [online] retrieved on Jun. 20, 2025 from: https://www.pharmaexcipients.com/sodium-stearyl-fumarate-excipient/; 7 pages. (Year: 2025).*

(Continued)

*Primary Examiner* — Ernst V Arnold
(74) *Attorney, Agent, or Firm* — Maschoff Brennan

(57) ABSTRACT

The present disclosure discloses a homogeneous pharmaceutical excipient sodium stearyl fumarate with flaky structure and preparation method thereof, which belongs to the field of pharmaceutical excipient refining technology. The method of the present disclosure includes: heating and dissolving sodium stearyl fumarate to be treated in an ethanol solution and filtering to remove impurities, then adding crystal seeds for recrystallization. The crystallized sodium stearyl fumarate with flaky structure has narrow particle size distribution, average particle size of 5-15 μm, intact flaky structure, good uniformity and purity up to (Continued)

99.6% or more, and it is not easy-caking and can keep the powder state for a long time.

19 Claims, 4 Drawing Sheets

(51) Int. Cl.
*A61K 47/14* (2017.01)
*C07C 67/52* (2006.01)
*C07C 69/60* (2006.01)

(56) References Cited

FOREIGN PATENT DOCUMENTS

| CN | 108586250 A | 9/2018 |
| CN | 113845423 A | 12/2021 |

OTHER PUBLICATIONS

Google English translation of: CN113845423A; published Dec. 28, 2021; 19 pages. (Year: 2021).*
CN Office Action dated Dec. 14, 2022 as received in Application No. 202111061255.5.

* cited by examiner

HOMOGENEOUS PHARMACEUTICAL EXCIPIENT SODIUM STEARYL FUMARATE WITH FLAKY STRUCTURE AND PREPARATION METHOD THEREOF

CROSS REFERENCE TO RELATED APPLICATION

This application is a national stage application of International Patent Application No. PCT/CN2022/117965, filed on Sep. 9, 2022, which claims the benefit and priority of Chinese Patent Application No. 202111061255.5, entitled "homogeneous pharmaceutical excipient sodium stearyl fumarate with flaky structure and preparation method thereof" filed on Sep. 10, 2021, both of which is incorporated by reference herein in their entireties.

TECHNICAL FIELD

The present disclosure belongs to the field of pharmaceutical excipient refining technology, and specifically relates to a homogeneous pharmaceutical excipient sodium stearyl fumarate with flaky structure and preparation method thereof.

BACKGROUND ART

Sodium stearyl fumarate ($C_{22}H_{39}NaO_4$) is an important excipient, which is widely used in food and pharmaceutical fields. Sodium stearyl fumarate is structurally formed by connecting stearyl alcohol at the hydrophobic end and sodium fumarate at the hydrophilic end through an ester bond. Sodium stearyl fumarate is hydrophilic and often used as a lubricant for tablets and capsules to improve disintegration and promote dissolution, with strong compatibility and stable properties, and is an excellent substitute for magnesium stearate. Sodium stearyl fumarate can be absorbed by human body and converted into stearyl alcohol and fumaric acid. Stearyl alcohol is further oxidized to stearic acid. Both stearyl alcohol and stearic acid are the main components of natural food. Fumaric acid is also a normal component of human tissues, non-toxic and non-irritating.

In the prior art, the refining method for preparing sodium stearyl fumarate is usually conducted as follows: at first, beating and washing sodium stearyl fumarate with organic solvent first to remove the residual soluble impurities, and then milling the obtained product with a special equipment to control the particle size within a suitable range. The disadvantages of this method are poor particle size uniformity, wide range of particle size distribution, serious destruction of the flaky structure, and easy-caking after a long period of time, resulting in inconvenience in the use of the formulation.

SUMMARY

In order to solve the above technical problems, the present disclosure provides a homogeneous pharmaceutical excipient sodium stearyl fumarate with flaky structure and preparation method thereof, using the method of recrystallization to refine sodium stearyl fumarate, which can crystallize the sodium stearyl fumarate that meets the particle size requirements, and the product has the advantages of high purity, narrower particle size range, complete flaky structure, good uniformity, and can still maintain the powder state for a long time and is not easy-caking.

The technical solution adopted in the present disclosure is as follows.

A method for preparing homogeneous pharmaceutical excipient sodium stearyl fumarate with flaky structure, including heating and dissolving the sodium stearyl fumarate to be treated in ethanol, and after filtering to remove impurities, adding crystal seeds for recrystallization.

The method specifically includes the following steps:
(1) heating and dissolving sodium stearyl fumarate to be treated in an ethanol solution, and filtering an obtained sodium stearyl fumarate solution while it is hot to obtain a filtered sodium stearyl fumarate solution;
(2) when the filtered sodium stearyl fumarate solution is cooled down to the mesostasis zone of 60° C. to 75° C., adding crystal seeds of the sodium stearyl fumarate;
(3) cooling down the obtained solution with circulating water from 10 to 50° C., conducting recrystallization of the sodium stearyl fumarate during the cooling down, and after complete recrystallization, stirring the recrystallized solution for a period of time, and then drying and milling after filtration, obtaining the homogeneous pharmaceutical excipient sodium stearyl fumarate with flaky structure.

In step (1), the volume concentration of the ethanol solution is 10% to 70%, preferably 10% to 50%. Sodium stearyl fumarate is insoluble in anhydrous ethanol, but soluble in hot water, and the sodium stearyl fumarate may completely dissolved in ethanol solution within the above concentration range at a certain heating temperature.

In step (1), the temperature for heating and dissolving is 70 to 90° C., preferably 75 to 85° C.

In step (1), the mass volume ratio of the sodium stearyl fumarate to ethanol solution is 1 g: 5-20 mL, preferably 1 g: 5-10 mL.

In step (2), preferably, the temperature is cooled down to 60° C. to 70° C.

In step (2), the rate of cooling down is controlled to be 0.1-0.3° C./min. If the rate of cooling down is too fast, the solute will precipitate in advance, and it will result in failure to reach the mesostasis zone. Once the solute precipitates in advance, it will form mixed crystals and lead to uneven size of the final crystalline material. If the rate of cooling down is too slow, the production efficiency will become lower.

A method for obtaining crystal seeds of sodium stearyl fumarate is as follows: wet-milling or dry-milling the sodium stearyl fumarate to be treated, obtaining the crystal seeds of sodium stearyl fumarate with an average particle size of 0.5 to 5 μm, preferably 1.5 to 4.5 μm. Combined with temperature control, the sodium stearyl fumarate product obtained after recrystallization of such size crystals has uniform particle size and complete flaky structure.

The dry-milling is one or more method selected from grinding method, mechanical commination method or pneumatic jet milling method.

The wet-milling is one or more method selected from homogenization method, homogeneous method or shearing method.

The crystal seeds of sodium stearyl fumarate are preferably prepared by wet-milling, and further preferably by homogenization method.

The homogenization method is conducted as follows: adding the sodium stearyl fumarate to be treated to 10%-70% ethanol in the material-liquid ratio of 1 g:5 mL for homogenization for 10-30 min, then obtaining the crystal seeds of sodium stearyl fumarate with an average particle size of 0.5-5 μm.

The mass of the crystal seeds of sodium stearyl fumarate is 0.5% to 5%, preferably 0.5% to 2%, of the mass of sodium stearyl fumarate to be treated.

In step (3), preferably, the obtained solution is cooled down with circulating water at 15 to 45° C. The solution is slowly cooled down with circulating water at a specific temperature to maintain a constant rate of crystallization, thus ensuring the size and uniformity of the crystals, and obtaining homogeneous sodium stearyl fumarate with flaky structure. If the temperature of the circulating water is too high during recrystallization, it will not crystallize normally. And if the temperature of the circulating water is too low, it will lead to too fast crystallization, too many mixed crystal products and uneven particle size of the product.

In step (2), stirring slowly after adding crystal seeds of sodium stearyl fumarate at a stirring speed of 45 r/min to maintain a constant rate of crystallization and thus ensure the size and uniformity of the crystals.

In step (3), after the recrystallization is complete, continue stirring for 0.5 to 1.5 h at a stirring speed of 60 r/min, so that the complete recrystallized solution is cooled down to room temperature and a filtration is conducted.

In step (3), the filtration is centrifugal filtration; the drying is vacuum drying, boiling drying or freeze-drying; the milling is the hammermilling, which can break up the material without destroying the original particle form.

The homogeneous pharmaceutical excipient sodium stearyl fumarate with flaky structure prepared by method herein has intact flaky structure with an average particle size of 5-15 μm.

In the method for preparing homogeneous pharmaceutical excipient sodium stearyl fumarate with flaky structure, first heating and dissolving sodium stearyl fumarate in an ethanol solution and filtering an obtained sodium stearyl fumarate solution while it is hot; and filtering the obtained sodium stearyl fumarate solution while it is hot can remove the insoluble impurities in the sodium stearyl fumarate, then cooling down the filtered sodium stearyl fumarate solution to the mesostasis zone and adding crystal seeds of the sodium stearyl fumarate with specific particle size, cooling down the obtained solution with circulating water from 10 to 50° C., conducting recrystallization of the sodium stearyl fumarate during the process of cooling, so that soluble impurities in sodium stearyl fumarate can be removed after the recrystallization. Through precise control of each process parameter in the above process, the particle size of sodium stearyl fumarate after recrystallization is controlled to a narrow distribution, with an average particle size of 5-15 μm, and homogeneous sodium stearyl fumarate with intact flaky structure is obtained.

Compared with the prior art, the method of the present disclosure is simple in operation and does not require the use of special milling equipment and sieving equipment. The obtained sodium stearyl fumarate with flaky structure has an average particle size of 5-15 μm, with a narrower particle size range, an intact flaky structure and better uniformity, and it is not easy-caking for long time storage, which is convenient for formulation production.

DETAILED DESCRIPTION OF THE EMBODIMENTS

The present disclosure is described in detail below with reference to Examples.

The raw materials and reagents in this disclosure are commercially available.

Example 1

Figure 1:
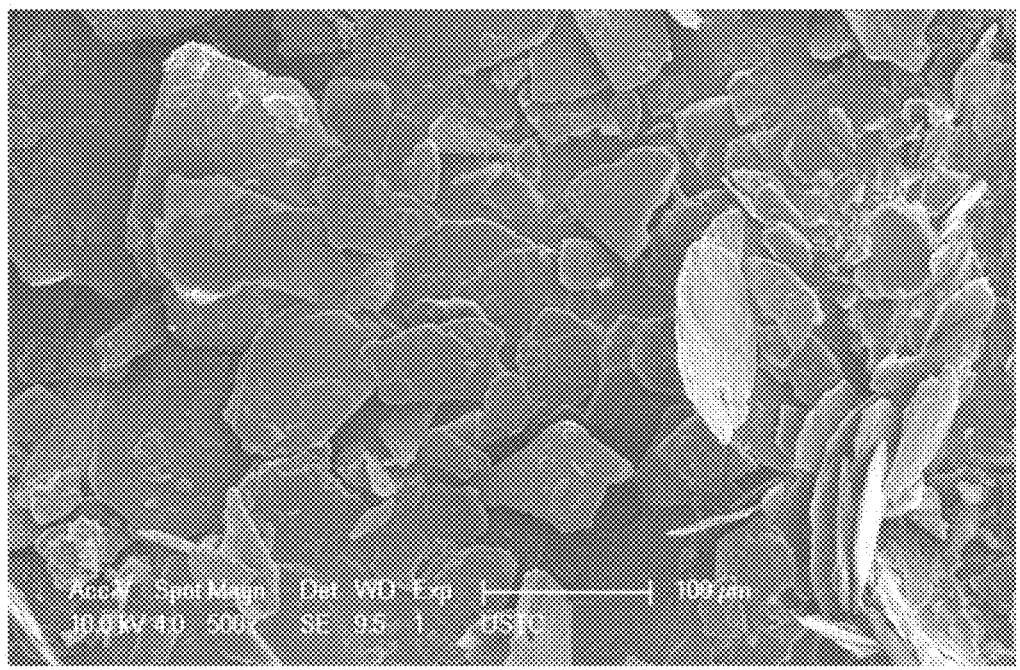
FIG. 1 shows the scanning electron micrograph (SEM) of the sodium stearyl fumarate to be treated.

The preparation of homogeneous pharmaceutical excipient sodium stearyl fumarate with flaky structure, comprising the following steps:

(1) 1000 mL of 40% concentration ethanol solution and 100 g of sodium stearyl fumarate to be treated were added into the reaction vessel and heated at 85° C. until the sodium stearyl fumarate was completely dissolved; where the scanning electron micrograph of the sodium stearyl fumarate to be treated was shown in FIG. 1, from which it could be seen that it had flaky structure in different sizes with poor integrity;

(2) the sodium stearyl fumarate solution obtained in step 1) was filtered through a filter bag while it was hot, and the filtered sodium stearyl fumarate solution was added into another reaction vessel and cooled down slowly to 70° C. at a rate of 0.15° C./min;

3) 1 g of sodium stearyl fumarate to be treated was taken, and added with 5 mL of ethanol to homogenize for 20 min, then the crystal seeds of sodium stearyl fumarate were obtained when the average particle size is 2.3 μm detecting by wet test; and the obtained crystal seeds of sodium stearyl fumarate were added to step 2), stirred slowly at the stirring speed of 45 r/min, then the reaction vessel was cooled down with circulating water of 45° C., after complete crystallization, the resulting mixture in the reaction vessel was stirred at 60 r/min for 1 h at room temperature;

(4) after centrifugal filtration of the mixture, the precipitate was vacuum dried at 65° C. for and then the dried material was sent to the hammermilling to break up, then 93.3 g of sodium stearyl fumarate with yield of 92.38% was obtained, and the content of the obtained sodium stearyl fumarate was 100.3% by gas detection.

Figure 2:
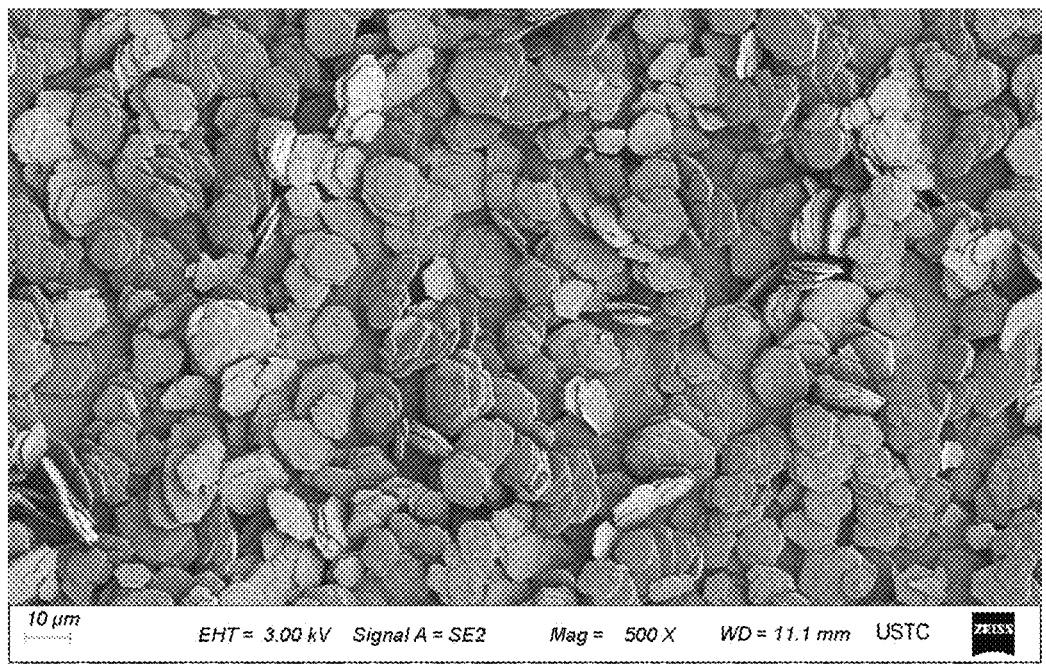
FIG. 2 shows the SEM of the sodium stearyl fumarate prepared in Example 1.

The SEM of the homogeneous pharmaceutical excipient sodium stearyl fumarate with flaky structure prepared in this Example is shown in FIG. 2. It can be seen that the pharmaceutical excipient sodium stearyl fumarate has intact and homogeneous flaky structure with small particle size.

Example 2

The preparation of homogeneous pharmaceutical excipient sodium stearyl fumarate with flaky structure, comprising the following steps:

(1) 1000 mL of 30% concentration ethanol solution and 100 g of sodium stearyl fumarate to be treated were added into the reaction vessel and heated at 80° C. until the sodium stearyl fumarate was completely dissolved;

(2) the sodium stearyl fumarate solution obtained in step 1) was filtered through a filter bag while it was hot, and the filtered sodium stearyl fumarate solution was added into another reaction vessel and cooled down slowly to 65° C. at a rate of 0.2° C./min;

3) 1.5 g of sodium stearyl fumarate to be treated was taken, and added with 7.5 mL of ethanol to homogenize for 10 min, then the crystal seeds of sodium stearyl fumarate were obtained when the average particle size is 4.4 μm detecting by wet test; and the obtained crystal seeds of sodium stearyl fumarate were added to step 2), stirred slowly at the stirring speed of 45 r/min, then the reaction vessel was cooled down with circulating water of 40° C., after complete crystallization, the resulting mixture in the reaction vessel was stirred at 60 r/min for 1 h at room temperature;

(4) after centrifugal filtration of the mixture, the precipitate was vacuum dried at 68° C. for 5 h, and then the dried material was sent to the hammermilling to break up, then 91.8 g of sodium stearyl fumarate with yield of 90.44% was obtained, and the content of the obtained sodium stearyl fumarate was 99.6% by gas detection.

Example 3

The preparation of homogeneous pharmaceutical excipient sodium stearyl fumarate with flaky structure, comprising the following steps:

(1) 1000 mL of 20% concentration ethanol solution and 100 g of sodium stearyl fumarate to be treated were added into the reaction vessel and heated at 80° C. until the sodium stearyl fumarate was completely dissolved;

(2) the sodium stearyl fumarate solution obtained in step 1) was filtered through a filter bag while it was hot, and the filtered sodium stearyl fumarate solution was added into another reaction vessel and cooled down slowly to 68° C. at a rate of 0.15° C./min;

3) 2.5 g of sodium stearyl fumarate to be treated was taken, and added with 12.5 mL of ethanol to homogenize for 25 min, then the crystal seeds of sodium stearyl fumarate were obtained when the average particle size is 2.1 μm detecting by wet test; and the obtained crystal seeds of sodium stearyl fumarate were added to step 2), stirred slowly at the stirring speed of 45 r/min, then the reaction vessel was cooled down with circulating water of 35° C., after complete crystallization, the resulting mixture in the reaction vessel was stirred at 60 r/min for 1 h at room temperature;

(4) after centrifugal filtration of the mixture, the precipitate was vacuum dried at 70° C. for and then the dried material was sent to the hammermilling to break up, then 92.3 g of sodium stearyl fumarate with yield of 90.05% was obtained, and the content of the obtained sodium stearyl fumarate was 99.6% by gas detection.

Example 4

The preparation of homogeneous pharmaceutical excipient sodium stearyl fumarate with flaky structure, comprising the following steps:

(1) 1000 mL of 15% concentration ethanol solution and 100 g of sodium stearyl fumarate to be treated were added into the reaction vessel and heated at 82° C. until the sodium stearyl fumarate was completely dissolved;

(2) the sodium stearyl fumarate solution obtained in step 1) was filtered through a filter bag while it was hot, and the filtered sodium stearyl fumarate solution was added into another reaction vessel and cooled down slowly to 68° C. at a rate of 0.2° C./min;

3) 4 g of sodium stearyl fumarate to be treated was taken, and added with 20 mL of ethanol to homogenize for 20 min, then the crystal seeds of sodium stearyl fumarate were obtained when the average particle size is 2.4 μm detecting by wet test; and the obtained crystal seeds of sodium stearyl fumarate were added to step 2), stirred slowly at the stirring speed of 45 r/min, then the reaction vessel was cooled down with circulating water of 35° C., after complete crystallization, the resulting mixture in the reaction vessel was stirred at 60 r/min for 1 h at room temperature;

(4) after centrifugal filtration of the mixture, the precipitate was vacuum dried at 70° C. for and then the dried material was sent to the hammermilling to break up, then 96.8 g of sodium stearyl fumarate with yield of 93.08% was obtained, and the content of the obtained sodium stearyl fumarate was 100.1% by gas detection.

Example 5

The preparation of homogeneous pharmaceutical excipient sodium stearyl fumarate with flaky structure, comprising the following steps:

(1) 1000 mL of 50% concentration ethanol solution and 100 g of sodium stearyl fumarate to be treated were added into the reaction vessel and heated at 80° C. until the sodium stearyl fumarate was completely dissolved;

(2) the sodium stearyl fumarate solution obtained in step 1) was filtered through a filter bag while it was hot, and the filtered sodium stearyl fumarate solution was added into another reaction vessel and cooled down slowly to 70° C. at a rate of 0.15° C./min;

3) 2 g of sodium stearyl fumarate to be treated was taken, and added with 10 mL of ethanol to homogenize for 30 min, then the crystal seeds of sodium stearyl fumarate were obtained when the average particle size is 2.0 μm detecting by wet test; and the obtained crystal seeds of sodium stearyl fumarate were added to step 2), stirred slowly at the stirring speed of 45 r/min, then the reaction vessel was cooled down with circulating water of 35° C., after complete crystallization, the resulting mixture in the reaction vessel was stirred at 60 r/min for 1 h at room temperature;

(4) after centrifugal filtration of the mixture, the precipitate was vacuum dried at 65° C. for 5 h, and then the dried material was sent to the hammermilling to break up, then 89.8 g of sodium stearyl fumarate with yield of 88.04% was obtained, and the content of the obtained sodium stearyl fumarate was 99.8% by gas detection.

Comparative Example 1

The preparation method was the same as Example 1, except that the 40% concentration ethanol solution in step (1) was replaced by an equal volume of purified water. 89.3 g of sodium stearyl fumarate with yield of 88.42% was obtained, and the content of the obtained sodium stearyl fumarate was 88.5% by gas detection.

Figure 3:
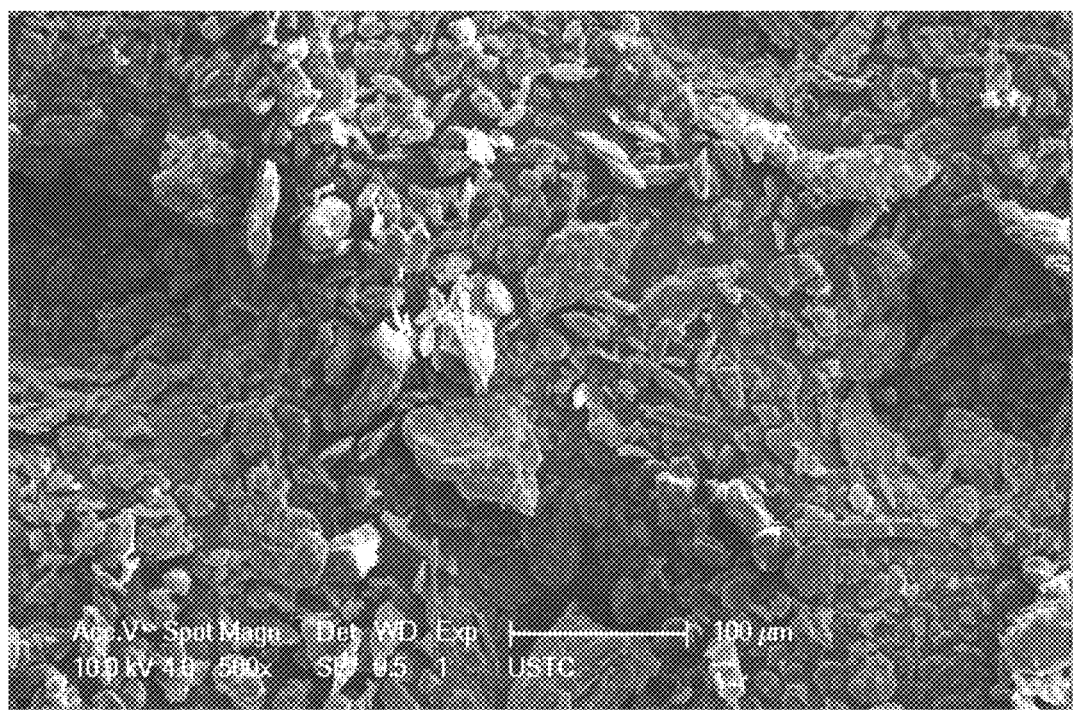
FIG. 3 shows the SEM of sodium stearyl fumarate prepared in Comparative example 1.

The SEM of the sodium stearyl fumarate prepared according to this Comparative example is shown in FIG. 3, with incomplete flaky structure and different particle size.

Comparative Example 2

The preparation method was the same as Example 1, except that the filtered sodium stearyl fumarate solution was cooled down to 55° C. in step (2). Then crystal seeds of sodium stearyl fumarate was added. At this time, a large amount of solute had been precipitated in advance. 91.7 g of sodium stearyl fumarate with yield of 90.79% was obtained, and the content of the obtained sodium stearyl fumarate was 100.9% by gas detection.

Figure 4:
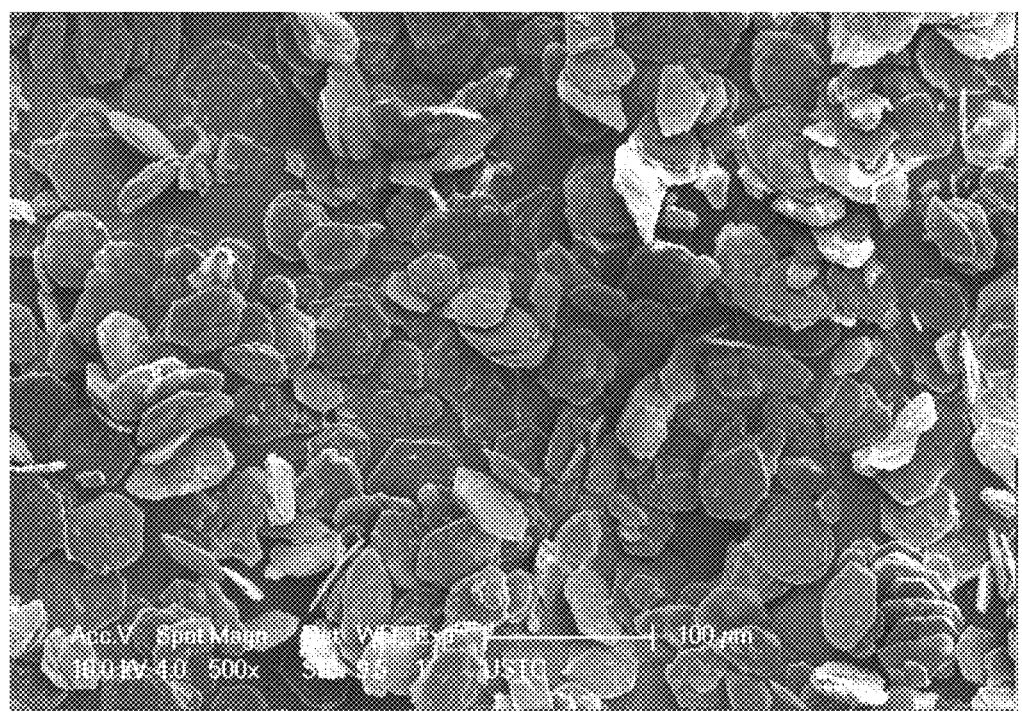
FIG. 4 shows the SEM of sodium stearyl fumarate prepared in Comparative example 2.

The SEM of the sodium stearyl fumarate prepared according to this Comparative example is shown in FIG. 4, with intact flaky structure, different particle size and poor uniformity.

Comparative Example 3

The preparation method was the same as Example 1, except that the crystal seeds of sodium stearyl fumarate in step (2) were not homogenized, and the sodium stearyl fumarate with an average size of 12.64 μm was directly used as the crystal seeds. 89.3 g of sodium stearyl fumarate with yield of 88.42% was obtained, and the content of the obtained sodium stearyl fumarate was 99.8% by gas detection.

Figure 5:
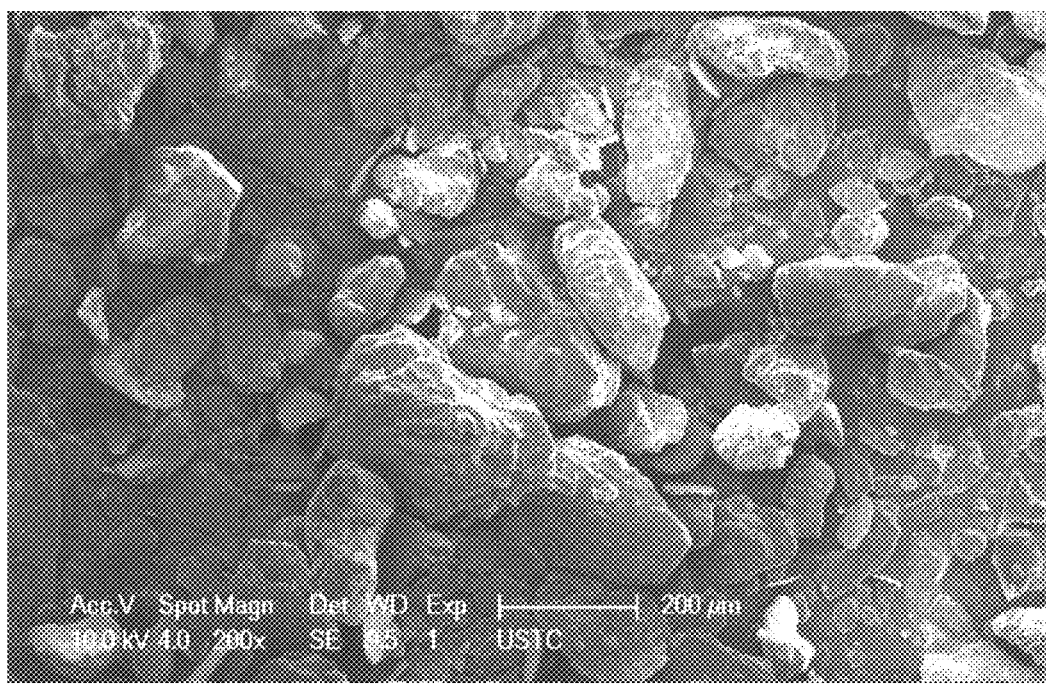
FIG. 5 shows the SEM of sodium stearyl fumarate prepared in Comparative example 3.

The SEM of the sodium stearyl fumarate prepared according to this Comparative example is shown in FIG. 5, with incomplete flaky structure, too large and different particle size.

Comparative Example 4

The preparation method was the same as Example 1, except that the filtered sodium stearyl fumarate solution was cooled down to 70° C. at a rate of 1° C./min in step (2). Some solutes had been precipitated during the cooling down process; while no solute was precipitated in the solution in Examples 1-5 before the addition of crystal seeds.

87.8 g of sodium stearyl fumarate with yield of 86.93% was obtained according to this Comparative example, and the content of the obtained sodium stearyl fumarate was 100.4% by gas detection.

Figure 6:
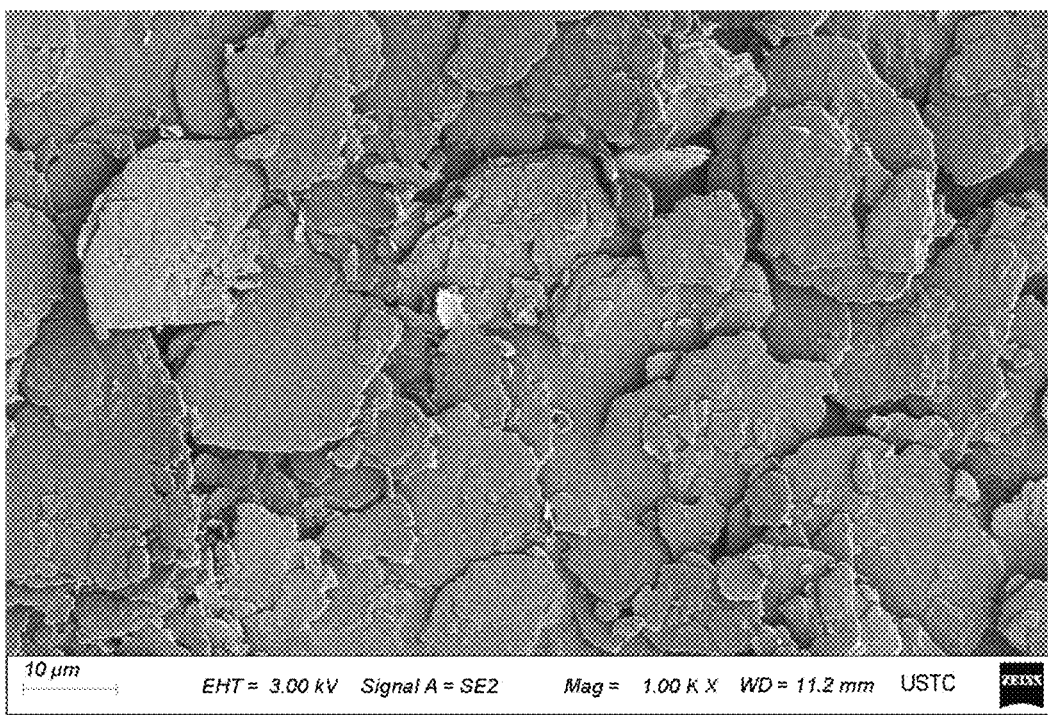
FIG. 6 shows the SEM of sodium stearyl fumarate prepared in Comparative example 4.

The SEM of the sodium stearyl fumarate prepared according to this Comparative example is shown in FIG. 6, with many heterocrystals, uneven particle size, and poor integrity.

Comparative Example 5

The preparation method was the same as Example 1, except that the reaction vessel was cooled down with circulating water of 5° C. in step (3). 93.1 g of sodium stearyl fumarate with yield of 92.17% was obtained, and the content of the obtained sodium stearyl fumarate was 99.7% by gas detection.

Figure 7:
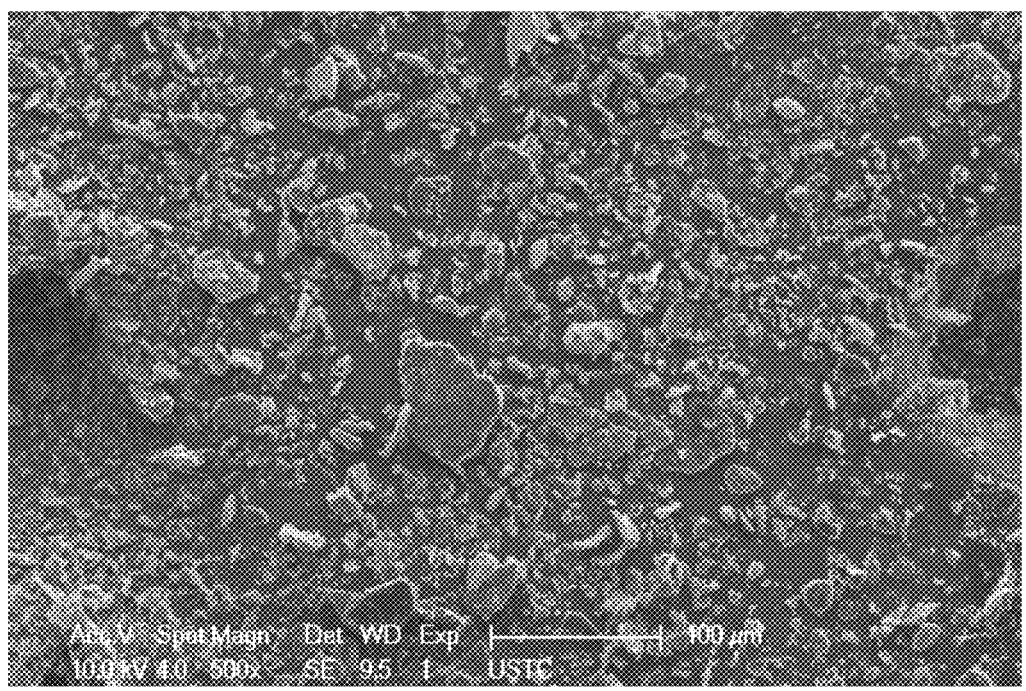
FIG. 7 shows the SEM of sodium stearyl fumarate prepared in Comparative example 5.

The SEM of the sodium stearyl fumarate prepared according to this Comparative example is shown in FIG. 7, with many heterocrystals, uneven particle size, and poor integrity.

The assay results of the sodium stearyl fumarate to be treated and the homogeneous pharmaceutical excipient sodium stearyl fumarate with flaky structure prepared in each of the above Examples and the Comparative examples are shown in Tables 1 and 2.

TABLE 1

Assay results of sodium stearyl fumarate to be treated and sodium stearyl fumarate prepared in Examples 1 to 5

| Items | Chinese Pharmacopoeia 2020 Edition | Sodium stearyl fumarate to be treated | Example 1 | Example 2 | Example 3 | Example 4 | Example 5 |
|---|---|---|---|---|---|---|---|
| Appearance | This product is a white or off-white powder. It may carry flat spherical particle aggregates. | Meet the requirements | Meet the requirements | Meet the requirements | Meet the requirements | Meet the requirements | Meet the requirements |
| Saponification value | 142.2-146.0, calculated as anhydrous. | 143.3 | 142.5 | 142.9 | 144.5 | 144.1 | 143.3 |
| Identification | The infrared absorption spectrum of this product is consistent with the spectrum of the control | Meet the requirements | Meet the requirements | Meet the requirements | Meet the requirements | Meet the requirements | Meet the requirements |
| Related substances | Sodium stearylmaleate ≤0.25% | Qualified | Qualified | Qualified | Qualified | Qualified | Qualified |
| | Other individual impurities ≤0.5% | Qualified | Qualified | Qualified | Qualified | Qualified | Qualified |
| | Total Impurities ≤5.0% | 0.35% | 0.08% | 0.08% | 0.11% | 0.10% | 0.06% |
| Determination of water | ≤5.0% | 3.02% | 2.98% | 3.30% | 3.13% | 2.94% | 2.87% |

TABLE 1-continued

Assay results of sodium stearyl fumarate to be treated and sodium stearyl fumarate prepared in Examples 1 to 5

| Items | | Chinese Pharmacopoeia 2020 Edition | Sodium stearyl fumarate to be treated | Example 1 | Example 2 | Example 3 | Example 4 | Example 5 |
|---|---|---|---|---|---|---|---|---|
| Lead | | ≤10 ppm | <10 ppm | <10 ppm | <10 ppm | <10 ppm | <10 ppm | <10 ppm |
| Content determination | | The content of $C_{22}H_{39}NaO_4$ is 99-101.5%, calculated as anhydrous. | 99.5% | 100.3% | 99.6% | 99.6% | 100.1% | 99.8% |
| Particle size/μm | D10 | Marking | 2.766 | 2.286 | 2.404 | 2.051 | 1.822 | 2.556 |
| | D50 | Marking | 13.91 | 6.599 | 7.873 | 6.008 | 4.523 | 8.004 |
| | D90 | Marking | 65.07 | 13.76 | 15.98 | 11.88 | 10.01 | 16.16 |
| Specific surface area/m²/g | | Marking | 0.98434 | 1.90345 | 1.82131 | 2.13582 | 2.53361 | 1.68859 |

TABLE 2

Assay results of sodium stearyl fumarate to be treated and sodium stearyl fumarate prepared in Comparative examples 1 to 5

| Items | | Chinese Pharmacopoeia 2020 Edition | Sodium stearyl fumarate to be treated | Comparative example 1 | Comparative example 2 | Comparative example 3 | Comparative example 4 | Comparative example 5 |
|---|---|---|---|---|---|---|---|---|
| Appearance | | This product is a white or off-white powder. It may carry flat spherical particle aggregates . . . | Meet the requirements | Meet the requirements | Meet the requirements | Meet the requirements | Meet the requirements | Meet the requirements |
| Saponification value | | 142.2-146.0, calculated as anhydrous. | 143.3 | 145.8 | 144.5 | 144.1 | 143.3 | 142.7 |
| Identification | | The infrared absorption spectrum of this product is consistent with the spectrum of the control | Meet the requirements | Meet the requirements | Meet the requirements | Meet the requirements | Meet the requirements | Meet the requirements |
| Related substances | | Sodium stearylmaleate ≤0.25% | Qualified | Qualified | Qualified | Qualified | Qualified | Qualified |
| | | Other individual impurities ≤0.5% | Qualified | Qualified | Qualified | Qualified | Qualified | Qualified |
| | | Total Impurities ≤5.0% | 0.35% | 0.17% | 0.09% | 0.13% | 0.11% | 0.14% |
| Determination of water | | ≤5.0% | 3.02% | 3.86% | 2.88% | 3.00% | 3.03% | 3.14% |
| Lead | | ≤10 ppm | <10 ppm | <10 ppm | <10 ppm | <10 ppm | <10 ppm | <10 ppm |
| Content determination | | The content of $C_{22}H_{39}NaO_4$ is 99-101.5%, calculated as anhydrous. | 99.5% | 99.5% | 100.9% | 99.8% | 100.4% | 99.7% |
| Particle size/μm | D10 | Marking | 2.766 | 0.895 | 2.056 | 7.457 | 2.455 | 1.482 |
| | D50 | Marking | 13.91 | 5.559 | 12.08 | 25.82 | 11.12 | 7.129 |
| | D90 | Marking | 65.07 | 11.34 | 55.46 | 87.64 | 33.84 | 13.08 |
| Specific surface area/m²/g | | Marking | 0.98434 | 2.10566 | 1.08531 | 0.58657 | 1.59253 | 1.98612 |

It can be seen from FIG. 2 and Table 1 that the proportion of sodium stearyl fumarate prepared in Example 1 with a particle size below 13.76 μm is 90%; the proportion of sodium stearyl fumarate prepared in Example 2 with a particle size below 15.98 μm is 90%; the proportion of sodium stearyl fumarate prepared in Example 3 with a particle size below 11.88 μm is 90%; the proportion of sodium stearyl fumarate prepared in Example 4 with a particle size below 10.01 μm is 90%; the proportion of sodium stearyl fumarate prepared in Example 5 with a particle size below 16.16 μm is 90%. It can be seen that the particle size of sodium stearyl fumarate prepared by each Example in present disclosure is small and uniform, the particle size distribution range is narrow, and the specific surface area is large.

It can be seen from FIGS. 3-7 and Table 2, that the proportion of sodium stearyl fumarate prepared in Comparative example 1 with a particle size below 11.34 μm is 90%, but the particle size uniformity is poor, the particle size distribution range is wide, and the flaky structure is not uniform and incomplete. The sodium stearyl fumarate prepared in Comparative example 2 has large particle size with poor uniformity and the particle size distribution range is wide. The sodium stearyl fumarate prepared in Comparative example 3 has poor uniformity and low specific surface area. The sodium stearyl fumarate prepared in Comparative example 4 has large particle size with poor uniformity and the particle size distribution range is wide. The particle size of sodium stearyl fumarate prepared in Comparative example 5 has poor uniformity and the distribution range of which is wide.

It can be seen from the above assay that the sodium stearyl fumarate prepared by the method of the present disclosure have an intact flaky structure, controlled particle size and specific surface area, few impurities, and significantly improved product quality.

The above detailed description of the homogeneous pharmaceutical excipient sodium stearyl fumarate with flaky structure and preparation method thereof with reference to the Examples is illustrative rather than limiting, and several embodiments may be enumerated according to the limited scope, so that variations and modifications without departing from the general concept of the present disclosure shall fall within the claimed scope of the present disclosure.

What is claimed is:

1. A method for preparing homogeneous pharmaceutical excipient sodium stearyl fumarate with flaky structure, wherein the method comprises the following steps:
    (1) heating and dissolving sodium stearyl fumarate to be treated in an ethanol solution, and filtering an obtained sodium stearyl fumarate solution while it is hot to obtain a filtered sodium stearyl fumarate solution;
    (2) cooling the filtered sodium stearyl fumarate solution to a mesostasis zone of 60° C. to 75° C., adding crystal seeds of the sodium stearyl fumarate;
    (3) cooling down an obtained solution in step (2) with circulating water from 10 to 50° C., conducting recrystallization of the sodium stearyl fumarate during the cooling down, and after complete recrystallization, stirring the recrystallized solution for a period of time, and then drying and milling after filtration, and obtaining the homogeneous pharmaceutical excipient sodium stearyl fumarate with flaky structure.

2. The method according to claim 1, wherein, in step (1), the volume concentration of the ethanol solution is 10% to 70%; and the temperature for the heating and dissolving is 70 to 90° C.

3. The method according to claim 2, wherein, in step (1), the volume concentration of the ethanol solution is 10% to 50%.

4. The method according to claim 2, wherein, in step (1), the temperature for the heating and dissolving is 75 to 85° C.

5. The method according to claim 1, wherein, in step (1), the mass volume ratio of the sodium stearyl fumarate to the ethanol solution is 1 g:5-20 mL.

6. The method according to claim 5, wherein, in step (1), the mass volume ratio of the sodium stearyl fumarate to the ethanol solution is 1 g:5-10 mL.

7. The method according to claim 1, wherein, a preparation method of crystal seeds of the sodium stearyl fumarate are as follows: wet-milling or dry-milling the sodium stearyl fumarate to be treated, and obtaining the crystal seeds of sodium stearyl fumarate with an average particle size of 0.5 to 5 μm.

8. The method according to claim 7, wherein dry-milling is one or more method selected from grinding method, mechanical comminution method or pneumatic jet milling method; the wet-milling is one or more method selected from homogeneous method, homogenization method or shearing method.

9. The method according to claim 8, wherein, the crystal seeds of sodium stearyl fumarate are prepared by conducting homogenization method on the sodium stearyl fumarate to be treated.

10. The method according to claim 9, wherein, the homogenization method is conducted as follows: adding the sodium stearyl fumarate to be treated to 10%-70% ethanol in a material-liquid ratio of 1 g:5 mL for homogenization for 10-30 min, then obtaining the crystal seeds of sodium stearyl fumarate with an average particle size of 0.5-5 μm.

11. The method according to claim 1, wherein, in step (2), mass of the crystal seeds of sodium stearyl fumarate is 0.5% to 5% of mass of the sodium stearyl fumarate to be treated.

12. The method according to claim 11, wherein, in step (2), mass of the crystal seeds of sodium stearyl fumarate is 0.5% to 2% of mass of sodium stearyl fumarate to be treated.

13. The method according to claim 1, wherein, in step (2), the temperature of the filtered sodium stearyl fumarate solution when the crystal seeds of sodium stearyl fumarate are added is 60° C. to 70° C.

14. The method according to claim 1, wherein, in step (2), temperature is controlled to cool down in a rate of 0.1~0.3° C./min.

15. The method according to claim 1, wherein, in step (3), the process of cooling down the obtained solution is conducted with circulating water at 15 to 45° C.

16. The method according to claim 1, wherein, in step (3), the stirring is continued for 0.5 to 1.5 h.

17. The method according to claim 1, wherein, in step (2), the stirring is conducted in a speed of 60 r/min.

18. The method according to claim 1, wherein, in step (2), after adding the crystal seeds of sodium stearyl fumarate, stirring slowly in a speed of 45 r/min.

19. The method according to claim 1, wherein, in step (3), the filtration is centrifugal filtration; the drying is vacuum drying, boiling drying or freeze drying; the milling is hammermilling.

* * * * *